(12) United States Patent
Hayashi et al.

(10) Patent No.: US 10,981,352 B2
(45) Date of Patent: Apr. 20, 2021

(54) METHOD FOR PRODUCING OPTICAL MEMBER, AND OPTICAL MEMBER

(71) Applicant: Sharp Kabushiki Kaisha, Sakai (JP)

(72) Inventors: Hidekazu Hayashi, Sakai (JP); Tokio Taguchi, Sakai (JP); Kenichiro Nakamatsu, Sakai (JP); Hisashi Maruyama, Nara (JP); Nobuaki Nakao, Nara (JP); Suguru Aoki, Nara (JP)

(73) Assignee: Sharp Kabushiki Kaisha, Sakai (JP)

( * ) Notice: Subject to any disclaimer, the term of this patent is extended or adjusted under 35 U.S.C. 154(b) by 210 days.

(21) Appl. No.: 16/094,523

(22) PCT Filed: Mar. 6, 2017

(86) PCT No.: PCT/JP2017/008769
§ 371 (c)(1),
(2) Date: Oct. 18, 2018

(87) PCT Pub. No.: WO2017/187793
PCT Pub. Date: Nov. 2, 2017

(65) Prior Publication Data
US 2019/0118504 A1    Apr. 25, 2019

(30) Foreign Application Priority Data
Apr. 28, 2016    (JP) .............................. JP2016-091038

(51) Int. Cl.
*B32B 3/30*    (2006.01)
*B32B 27/08*    (2006.01)
(Continued)

(52) U.S. Cl.
CPC ................ *B32B 3/30* (2013.01); *B32B 27/08* (2013.01); *G02B 1/118* (2013.01); *G02B 1/14* (2015.01); *G02B 1/18* (2015.01)

(58) Field of Classification Search
CPC ........... B32B 3/30; B32B 27/08; G02B 1/118; G02B 1/14; G02B 1/18
See application file for complete search history.

(56) References Cited

U.S. PATENT DOCUMENTS

2009/0246494 A1    10/2009    Matsumoto
2015/0166704 A1    6/2015    Otani et al.
2017/0066207 A1*    3/2017    Hayashi ................ B29C 59/026

FOREIGN PATENT DOCUMENTS

JP         4938675 B2     5/2012
JP         5042386 B2    10/2012
WO      2013/187528 A1   12/2013

OTHER PUBLICATIONS

Official Communication issued in International Patent Application No. PCT/JP2017/008769, dated Apr. 11, 2017.

* cited by examiner

*Primary Examiner* — Mathieu D Vargot
(74) *Attorney, Agent, or Firm* — Keating & Bennett, LLP

(57) ABSTRACT

The method for producing an optical member of the present invention includes: Process (1) of applying a first resin to a substrate; Process (2) of applying a second resin to at least one of the first resin and a die; Process (3) of pushing the substrate to the die with the first resin and the second resin in between to form a resin layer including on a surface thereof an uneven structure; and Process (4) of curing the resin layer to provide a polymer layer. The die includes a surface after release treatment with a fluorine release agent. The first resin contains a resin component, and the resin component contains predetermined amounts of a (meth) acrylamide compound and a urethane prepolymer containing six or more functional groups. The second resin contains (Continued)

predetermined amounts of a reactive group-containing monomer, a fluorosurfactant, and a fluorine-containing monomer.

8 Claims, 3 Drawing Sheets

(51) Int. Cl.
*G02B 1/118* (2015.01)
*G02B 1/14* (2015.01)
*G02B 1/18* (2015.01)

METHOD FOR PRODUCING OPTICAL MEMBER, AND OPTICAL MEMBER

TECHNICAL FIELD

The present invention relates to methods for producing optical members, and to optical members. The present invention more specifically relates to a method for producing an optical member including an uneven structure of nanometer scale, and to an optical member.

BACKGROUND ART

Various optical members exhibiting antireflective performance have been studied (for example, see Patent Literatures 1 and 2). In particular, optical members having an uneven structure of nanometer scale (nanostructure) are known for their excellent antireflective performance. This uneven structure has a continuously varying refractive index from the air layer to the substrate, thereby capable of reducing reflected light significantly.

CITATION LIST

Patent Literature

Patent Literature 1: JP 4938675 B
Patent Literature 2: JP 5042386 B

SUMMARY OF INVENTION

Technical Problem

An example of such an optical member is a structure including a substrate and a polymer layer that has an uneven structure on a surface thereof and is disposed on the substrate. Unfortunately, conventional optical members show a trade-off relationship among the adhesiveness between the substrate and the polymer layer, the antifouling performance, and the rubbing resistance, and thus need to be improved so as to achieve all of these properties at high levels.

For example, according to Patent Literatures 1 and 2, they each provide a structure excellent in performance of preventing light reflection, performance of improving light transmission, and scratch resistance of the surface thereof. Still, these literatures fail to describe the adhesiveness between the substrate and the polymer layer, and thus the structures need to be improved.

The present invention is devised in view of the above state of the art, and aims to provide a method for producing an optical member excellent in adhesiveness between a substrate and a polymer layer, antifouling performance, and rubbing resistance, and to provide an optical member.

Solution to Problem

The present inventors studied a method for producing an optical member excellent in adhesiveness between a substrate and a polymer layer, antifouling performance, and rubbing resistance, and focused on a method including: applying a first resin to a substrate; applying a second resin to at least one of the first resin and a die; pushing the substrate to the die with the resins in between to form a resin layer having an uneven structure on a surface thereof; and curing the resin layer to provide a polymer layer. The present inventors then found that the presence of predetermined amounts of a (meth)acrylamide compound and a urethane prepolymer having six or more functional groups in the first resin and the presence of predetermined amounts of a reactive group-containing monomer, a fluorosurfactant, and a fluorine-containing monomer in the second resin can improve the adhesiveness between the substrate and the polymer layer, the antifouling performance, and the rubbing resistance. Finally, the present inventors have arrived at an excellent solution to the above problem, completing the present invention.

In other words, one aspect of the present invention may be a method for producing an optical member including a polymer layer that includes on a surface thereof an uneven structure provided with multiple projections at a pitch not longer than a wavelength of visible light, the method including: Process (1) of applying a first resin to a substrate; Process (2) of applying a second resin to at least one of the first resin and a die; Process (3) of pushing the substrate to the die with the first resin and the second resin in between to form a resin layer including on a surface thereof the uneven structure; and Process (4) of curing the resin layer to provide the polymer layer, the die including a surface after release treatment with a fluorine release agent, the first resin containing a resin component, the resin component containing 10 wt % or more and 30 wt % or less of a (meth)acrylamide compound and 20 wt % or more and 45 wt % or less of a urethane prepolymer containing six or more functional groups, with the whole quantity of the resin component taken as 100 wt %, the second resin containing 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin taken as 100 wt %.

Another aspect of the present invention may be an optical member including a substrate and a polymer layer that is disposed on a surface of the substrate and that includes on a surface thereof an uneven structure provided with multiple projections at a pitch not longer than a wavelength of visible light, the polymer layer being a cured product obtainable by stacking a second resin on a first resin and curing the first resin and the second resin with the uneven structure stamped on the second resin side, the first resin containing a resin component, the resin component containing 10 wt % or more and 30 wt % or less of a (meth)acrylamide compound and 20 wt % or more and 45 wt % or less of a urethane prepolymer containing six or more functional groups, with the whole quantity of the resin component taken as 100 wt %, the second resin containing 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin taken as 100 wt %.

Advantageous Effects of Invention

The present invention can provide a method for producing an optical member excellent in adhesiveness between a substrate and a polymer layer, antifouling performance, and rubbing resistance, and can provide an optical member.

DESCRIPTION OF EMBODIMENTS

Hereinafter, the present invention is described in more detail based on embodiments with reference to the drawings. The embodiments, however, are not intended to limit the scope of the present invention. Each of the configurations of the embodiments may appropriately be combined or modified within the spirit of the present invention.

Embodiment 1

Figure 1:
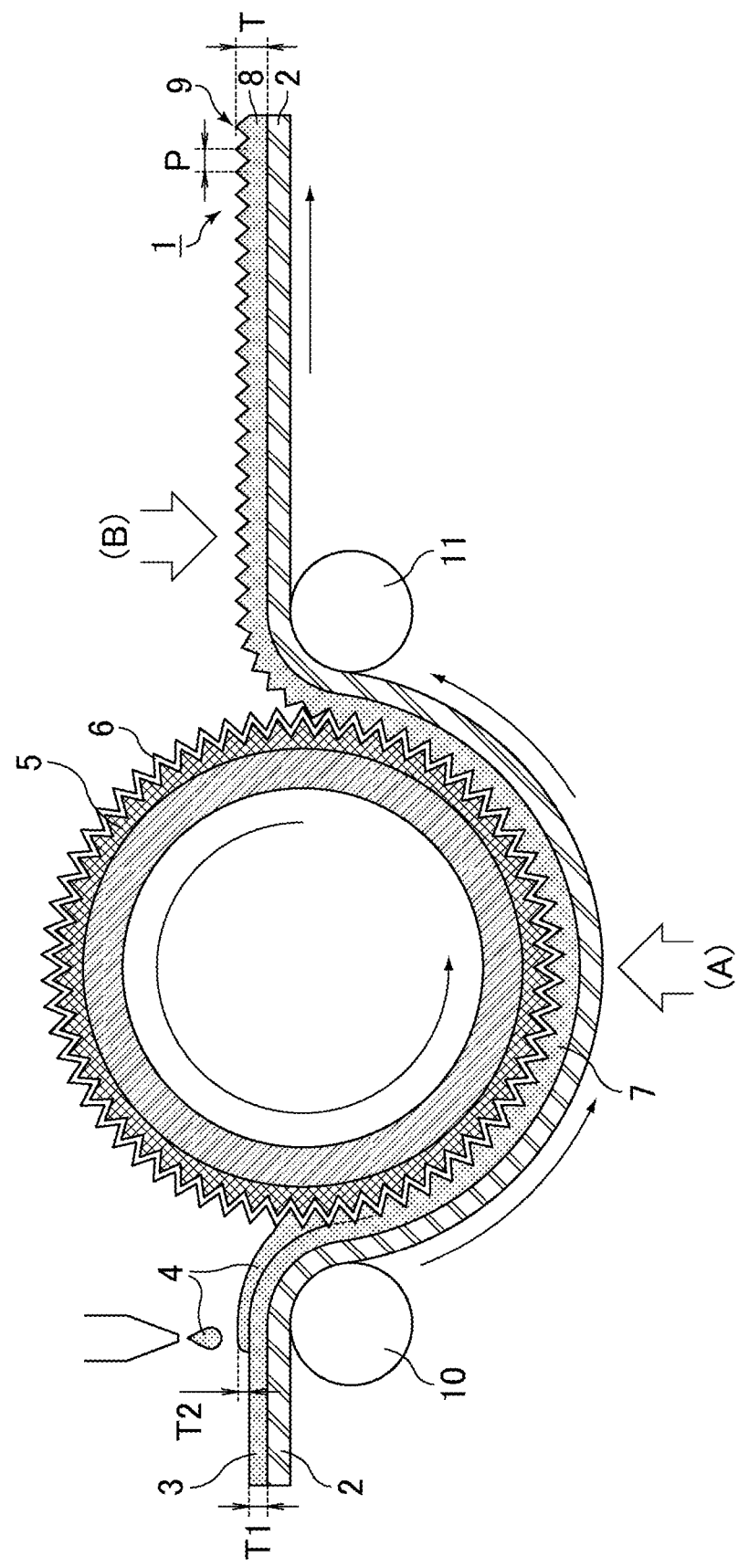
FIG. 1 is a schematic cross-sectional view illustrating a process of producing an optical member of Embodiment 1.

A method for producing an optical member of Embodiment 1 is described below with reference to FIG. 1. FIG. 1 is a schematic cross-sectional view illustrating a process of producing an optical member of Embodiment 1.
(Process (1): Application of First Resin)

First, a first resin 3 is applied to a substrate 2.

Examples of a technique of applying the first resin 3 include spray coating, gravure coating, and slot-die coating. In order to control the thickness of the layer easily and to reduce the device-related cost, spray coating is preferred. Particularly preferred is application using a swirl nozzle, an electrostatic nozzle, or an ultrasonic nozzle.
(Process (2): Application of Second Resin)

Next, a second resin 4 is applied to the first resin 3 applied. As a result, the second resin 4 is formed on the first resin 3 on the side opposite to the substrate 2.

The second resin 4 may be applied by the same method as in the application of the first resin 3 as described above.

The application of the first resin 3 (Process (1)) and the application of the second resin 4 (Process (2)) may be performed non-simultaneously as shown in FIG. 1, or may be performed simultaneously. An example of a method of applying the first resin 3 and the second resin 4 simultaneously is co-extrusion application.
(Process (3): Formation of Resin Layer)

Next, the substrate 2 is pushed to a die 5 using a nip roll 10 with the first resin 3 and the second resin 4 in between. As a result, a resin layer 7 is formed which has an uneven structure on the surface opposite to the substrate 2. In the resin layer 7, the first resin 3 and the second resin 4 are integrated with each other so that no interface exists between the resins. The surface of the die 5 is coated with a fluorine release agent in advance.
(Process (4): Curing of Resin Layer)

Next, the resin layer 7 is cured (polymerized), so that a polymer layer 8 is formed. As a result, an optical member 1 is completed. The uneven structure formed on the surface opposite to the substrate 2 of the polymer layer 8 corresponds to a structure provided with multiple projections (protrusions) 9 at a pitch P (distance between the apexes of adjacent projections 9) not longer than the wavelength of visible light, i.e., a moth-eye structure (a structure like a moth's eye). Thus, the optical member 1 can exert excellent antireflective performance (low reflectivity) owing to the moth-eye structure.

Examples of the method of curing the resin layer 7 include application of active energy rays and heating, and a method utilizing application of active energy rays is preferred. The active energy rays herein mean ultraviolet rays, visible light, infrared rays, plasma, or the like. The resin layer 7 is preferably one that is curable by ultraviolet rays. Application of active energy rays may be performed from the substrate 2 side simultaneously with the formation of the resin layer 7 as indicated by the arrow (A) in FIG. 1, or may be performed from the resin layer 7 side after the resin layer 7 is released from the die 5 using a release roll 11 as indicated by the arrow (B) in FIG. 1, or they may be performed in combination.

Application of active energy rays to the resin layer 7 may be performed either once or multiple times.

In the aforementioned production process, Processes (1) to (4) can be continuously and efficiently performed by consecutively sending the substrate 2 and rotating the die 5 as illustrated in FIG. 1.

Next, the materials used in production of the optical member 1 are described below.

The material of the substrate 2 may be, for example, triacetyl cellulose (TAC) (solubility parameter: 12.2 (cal/cm$^3$)$^{1/2}$), polyethylene terephthalate (PET) (solubility parameter: 10.7 (cal/cm$^3$)$^{1/2}$), polymethyl methacrylate (PMMA) (solubility parameter: 9.06 (cal/cm$^3$)$^{1/2}$), a cycloolefin polymer (COP)(solubility parameter: 7.4 (cal/cm$^3$)$^{1/2}$), or polycarbonate (PC), and may appropriately be selected in accordance with the usage environment. Such a material allows the substrate 2 to have high hardness and excellent transparency and weather resistance. The substrate 2 may have undergone easy adhesion treatment. For example, a triacetyl cellulose film (solubility parameter: 11 (cal/cm$^3$)$^{1/2}$) with easy adhesion treatment may be used. The substrate 2 may have undergone saponification treatment. For example, a saponified triacetyl cellulose film (solubility parameter: 16.7 (cal/cm$^3$)$^{1/2}$) may be used.

The substrate 2 may have a film shape or a sheet shape, for example. In order to produce a film-like optical member 1, the substrate 2 in the form of a film is used. The substrate 2 preferably constitutes part of a polarizer.

In order to ensure the transparency and processability, the substrate 2 preferably has a thickness of 10 μm or greater and 100 μm or smaller.

The first resin 3 contains a resin component. The resin component of the first resin 3 contains 10 wt % or more and 30 wt % or less of a (meth)acrylamide compound and 20 wt % or more and 45 wt % or less of a urethane prepolymer containing six or more functional groups, with the whole quantity of the resin component taken as 100 wt %.

The resin component of the first resin 3 contains a (meth)acrylamide compound. This enables strong binding between the substrate 2 and the polymer layer 8 owing to a hydrogen bond force of the amide group in the (meth)acrylamide compound, increasing the adhesiveness between the substrate 2 and the polymer layer 8. As in the present embodiment, in the method of forming the polymer layer 8 from the first resin 3 and the second resin 4, the presence of a (meth)acrylamide compound in the first resin 3 can efficiently increase the amount of the amide group on the surface of the polymer layer 8 on the substrate 2 side. The (meth)acrylamide compound herein means a compound represented by the following formula (i). The (meth)acryl means methacryl or acryl.

[Chem. 1]

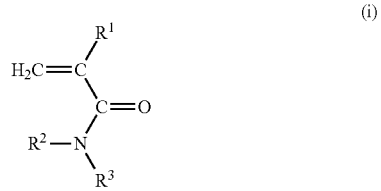

In the formula (i), $R^1$ is —H or —$CH_3$.

In the formula (i), $R^2$ and $R^3$ are each —H or an alkyl group.

Examples of the (meth)acrylamide compound include (meth)acrylamide, N-methyl (meth)acrylamide, N-ethyl (meth)acrylamide, N-propyl (meth)acrylamide, N-butyl (meth)acrylamide, N,N-dimethyl (meth)acrylamide, N,N-diethyl (meth)acrylamide, N,N-dipropyl (meth)acrylamide, N,N-dibutyl (meth)acrylamide, and (meth)acryloyl morpholine. A known example of N,N-dimethyl (meth)acrylamide is "DMAA®" (KJ Chemicals Corp.). The first resin 3 may contain one or multiple of these (meth)acrylamide compounds. The (meth)acrylamide compound preferably contains N,N-dimethyl (meth)acrylamide.

The proportion of the (meth)acrylamide compound in the resin component of the first resin 3 (hereinafter, also referred to simply as the proportion of the (meth)acrylamide compound) is 10 wt % or more and 30 wt % or less. Less than 10 wt % of the (meth)acrylamide compound may cause too small an amount of the amide group on the surface of the polymer layer 8 on the substrate 2 side, impairing the adhesiveness between the substrate 2 and the polymer layer 8. More than 30 wt % of the (meth)acrylamide compound may reduce the crosslinking density of a cured product of the resin layer 7, impairing the rubbing resistance of the polymer layer 8. Further, the antifouling performance (e.g., ease of wiping off fingerprints) is impaired. For the first resin 3 in which the resin component contains multiple (meth) acrylamide compounds, the sum of the proportions of the (meth)acrylamide compounds has only to fall within the above range. The proportion of the (meth)acrylamide compound is preferably 13 wt % or more and 19 wt % or less.

The resin component of the first resin 3 contains a urethane prepolymer containing six or more functional groups. This enables the polymer layer 8 to have an adequately high hardness, improving the rubbing resistance of the polymer layer 8. Examination by the present inventors shows that a certain composition of the second resin 4 to be mentioned later may soften the first resin 3. Still, the aforementioned composition of the first resin 3 (particularly, the proportion of the urethane prepolymer containing six or more functional groups) can maintain an adequately high hardness of the polymer layer 8. The urethane prepolymer herein means a urethane-forming reaction product of an organic polyisocyanate, a polyol, and a hydroxy-containing (meth)acrylic acid ester or a urethane-forming reaction product of an organic polyisocyanate and a hydroxy-containing (meth)acrylic acid ester. The number of functional groups of the urethane prepolymer means the number of (meth)acryloyl groups per molecule.

If the resin component of the first resin 3 contains only a urethane prepolymer containing less than six functional groups, the hardness of the polymer layer 8 is so low that the rubbing resistance of the polymer layer 8 is poor. The greater the number of functional groups in the urethane prepolymer, the harder the polymer layer 8 may be and the lower the flexibility thereof may be. In order to prevent such a problem, the upper limit of the number of functional groups in the urethane prepolymer is preferably 10. The resin component of the first resin 3 may further contain not only the urethane prepolymer containing six or more functional groups but also a urethane prepolymer containing less than six functional groups.

Examples of the urethane prepolymer containing six or more functional groups include those containing, as a constituent, any of organic polyisocyanates such as hexamethylene diisocyanate (HDI), isophorone diisocyanate (IPDI), tolylene diisocyanate (TDI), and xylylene diisocyanate (XDI); hydroxy-containing (meth)acrylic acid esters such as pentaerythritol triacrylate (PETA) and dipentaerythritol pentaacrylate (DPPA); and polyols such as diethylene glycol (DEG) and ethylene glycol (EG). The resin component of the first resin 3 may contain one or multiple of these urethane prepolymers containing six or more functional groups. The urethane prepolymer containing six or more functional groups preferably contains hexamethylene diisocyanate as a constituent.

The proportion of the urethane prepolymer containing six or more functional groups in the resin component of the first resin 3 (hereinafter, also referred to simply as the proportion of the urethane prepolymer containing six or more functional groups) is 20 wt % or more and 45 wt % or less. Less than 20 wt % of the urethane prepolymer containing six or more functional groups may cause too low a hardness of the polymer layer 8, impairing the rubbing resistance of the polymer layer 8 and, in some cases, causing sticking of the uneven structure. More than 45 wt % of the urethane prepolymer containing six or more functional groups may cause too high a hardness of the polymer layer 8, impairing the flexibility of the polymer layer 8 (making the polymer layer 8 brittle) and impairing the rubbing resistance. For the first resin 3 in which the resin component contains multiple urethane prepolymers containing six or more functional groups, the sum of the proportions of the urethane prepolymers has only to fall within the above range. The proportion of the urethane prepolymer containing six or more functional groups is preferably 30 wt % or more and 40 wt % or less.

The resin component of the first resin 3 may appropriately contain any of components such as a monofunctional (meth) acrylate and a multifunctional (meth)acrylate in addition to the aforementioned (meth)acrylamide compound and urethane prepolymer containing six or more functional groups.

Examples of the monofunctional (meth)acrylate include isobornyl (meth)acrylate, n-butyl (meth)acrylate, isobutyl (meth)acrylate, tert-butyl (meth)acrylate, n-pentyl (meth) acrylate, n-hexyl (meth)acrylate, n-octyl (meth)acrylate, isooctyl (meth)acrylate, 2-ethylhexyl (meth)acrylate, benzyl (meth)acrylate, phenoxyethyl (meth)acrylate, phenoxydiethylene glycol (meth)acrylate, glycidyl (meth)acrylate, 2-hydroxyethyl (meth)acrylate, 2-hydroxypropyl (meth)acrylate, 4-hydroxybutyl (meth)acrylate, diethylene glycol mono (meth)acrylate, triethylene glycol mono(meth)acrylate, dipropylene glycol mono(meth)acrylate, 2-methoxyethyl (meth)acrylate, methoxydiethylene glycol (meth)acrylate, methoxytriethylene glycol (meth)acrylate, methoxypolyethylene glycol (meth)acrylate, 2-butoxyethyl (meth)acrylate, butoxytriethylene glycol (meth)acrylate, 2-ethoxyethyl (meth)acrylate, 2-(2-ethoxyethoxy)ethyl (meth)acrylate, ethoxypolyethylene glycol (meth)acrylate, 4-nonylphenoxyethylene glycol (meth)acrylate, tetrahydrofurfuryl (meth) acrylate, caprolactone-modified tetrahydrofurfuryl (meth)

acrylate, cyclohexyl (meth)acrylate, 2-hydroxy-3-phenoxypropyl (meth)acrylate, cyclohexyl (meth)acrylate, cyclohexylmethyl (meth)acrylate, cyclohexylethyl (meth) acrylate, dicyclopentanyl (meth)acrylate, dicyclopentanyloxyethyl (meth)acrylate, dicyclopentenyl (meth)acrylate, dicyclopentenyloxyethyl (meth)acrylate, o-phenylphenoxyethyl (meth)acrylate, ethoxylated o-phenylphenol acrylate, phenoxyethyl acrylate, and benzyloxy acrylate. A known example of isobornyl (meth)acrylate is "Light Acrylate® IB-XA" (Kyoeisha Chemical Co., Ltd.). The resin component of the first resin 3 may contain one or multiple of these monofunctional acrylates.

Examples of the multifunctional (meth)acrylate include ethylene glycol di(meth)acrylate, diethylene glycol di(meth) acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, polytetramethylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, di(meth)acrylate of ethylene oxide adducts of bisphenol A, di(meth)acrylate of propylene oxide adducts of bisphenol A, bisphenoxyethanol fluorene di(meth)acrylate, dicyclopentanyl di(meth)acrylate, glycerol di(meth)acrylate, neopentyl glycol hydroxypivalate di(meth)acrylate, caprolactone-modified hydroxypivalate neopentyl glycol di(meth)acrylate, tetrabromobisphenol A di(meth)acrylate, hydropivalaldehyde-modified trimethylolpropane di(meth)acrylate, 1,4-cyclohexanedimethanol di(meth)acrylate, trimethylolpropane tri(meth)acrylate, di(meth)acrylate of ethylene oxide adducts of trimethylolpropane, di(meth)acrylate of propylene oxide adducts of trimethylolpropane, pentaerythritol tri(meth)acrylate, pentaerythritol tetra(meth)acrylate, dipentaerythritol penta(meth)acrylate, and dipentaerythritol hexa(meth)acrylate. Known examples of polyethylene glycol di(meth)acrylate include "Light Acrylate 9-EGA" and "Light Acrylate 14-EGA" (Kyoeisha Chemical Co., Ltd.). A known example of polytetramethylene glycol di(meth)acrylate is "NK ester A-PTMG-65" (Shin Nakamura Chemical Co., Ltd.). A known example of 1,9-nonanediol di(meth)acrylate is "Light Acrylate 1,9 ND-A" (Kyoeisha Chemical Co., Ltd.). Known examples of dipentaerythritol penta or hexa(meth) acrylate include "Light Acrylate DPE-6A" (Kyoeisha Chemical Co., Ltd.) and "Aronix® M-400" (Toagosei Co., Ltd.). The resin component of the first resin 3 may contain one or multiple of these multifunctional (meth)acrylates.

In addition to the aforementioned resin component, the first resin 3 may further contain any of additive components such as a polymerization initiator, a release agent, an antifoam, a leveling agent, a photostabilizer, an antioxidant, a polymerization inhibitor, an antistatic, and an ultraviolet absorber, as appropriate. Further, the first resin 3 may contain any of polymers such as (meth)acryl polymers, polyester elastomers, urethane polymers, and nitrile rubber, inorganic filler, organic filler, and coloring agents such as dyes and pigments, if necessary.

The polymerization initiator may be a photo-polymerization initiator, for example. The photo-polymerization initiator is active to active energy rays, and is added so as to initiate a polymerization reaction for polymerizing monomers. The photo-polymerization initiator may be, for example, a radical polymerization initiator, an anionic polymerization initiator, a cationic polymerization initiator, or the like. Examples of the photo-polymerization initiator include 1-hydroxycyclohexyl phenyl ketone, 1-phenyl-2-hydroxy-2-methylpropan-1-one, 2,2-dimethoxy-2-phenylacetophenone, benzophenone, 2-methyl[4-(methylthio)phenyl]-2-morpholino-1-propanone, 2-hydroxy-2-methyl-1-phenylpropan-1-one, 1-(4-isopropylphenyl)-2-hydroxy-2-methylpropan-1-one, 4-(2-hydroxyethoxy)phenyl-(2-hydroxy-2-propyl)ketone, 4-(2-acryloyloxyethoxy)phenyl-(2-hydroxy-2-propyl)ketone, 4-(2-methacryloyloxyethoxy)phenyl-(2-hydroxy-2-propyl)ketone, and 2,4,6-trimethylbenzoyl-diphenyl-phosphine oxide. A known example of 1-hydroxy cyclohexyl phenyl ketone is "Irgacure 184" (BASF SE). A known example of 2,4,6-trimethylbenzoyl diphenyl phosphine oxide is "Irgacure® TPO" (BASF SE). The first resin 3 (additive component) may contain one or multiple of these polymerization initiators.

The first resin 3 preferably contains 0.1 parts by weight or more and 10 parts by weight or less, more preferably 1 part by weight or more and 8 parts by weight or less, of a polymerization initiator with the whole quantity of the resin component taken as 100 parts by weight. Less than 0.1 parts by weight of the polymerization initiator relative to 100 parts by weight of the resin component of the first resin 3 may cause insufficient curing of the resin layer 7, failing to give desired physical properties. More than 10 parts by weight of the polymerization initiator may cause an unreacted polymerization initiator to remain, impairing the properties such as rubbing resistance and light resistance of the polymer layer 8.

The first resin 3 may contain a solvent, but preferably contains no solvent. In other words, it is preferably of solvent-free.

The first resin 3 has a thickness T1 of 1 μm or greater and 20 μm or smaller, more preferably 3 μm or greater and 10 μm or smaller. The first resin 3 having a thickness T1 of smaller than 1 μm may cause defects such as bubbles and fine foreign matter to be visible easily. The first resin 3 having a thickness T1 of greater than 20 μm may cause defects such as wrinkles and curl of the polymer layer 8 due to curing shrinkage of the resin layer 7. In the present embodiment, the thickness T1 of the first resin 3 means the distance between the surface on the substrate 2 side to the surface opposite to the substrate 2, as illustrated in FIG. 1.

The first resin 3 preferably has a viscosity of 70 mPa·s or higher and 10000 mPa·s or lower, more preferably 100 mPa·s or higher and 1000 mPa·s or lower, at 25° C. With the first resin 3 having a viscosity of lower than 70 mPa·s at 25° C., fluorine atoms in the second resin 4 to be described later may be less likely to distribute on the surface opposite to the substrate 2 of the polymer layer 8. The first resin 3 having a viscosity of higher than 10000 mPa·s at 25° C. may be less easy to apply.

The first resin 3 preferably has a solubility parameter of 10 $(cal/cm^3)^{1/2}$ or higher and 12 $(cal/cm^3)^{1/2}$ or lower, more preferably 11 $(cal/cm^3)^{1/2}$ or higher and 11.8 $(cal/cm^3)^{1/2}$ or lower. The first resin 3 having a solubility parameter of lower than 10 $(cal/cm^3)^{1/2}$ may impair the antifouling performance (e.g., ease of wiping off fingerprints) of the polymer layer 8. The first resin 3 having a solubility parameter of higher than 12 $(cal/cm^3)^{1/2}$ may impair the compatibility between the first resin 3 and the second resin 4 to be described later, causing the polymer layer 8 to be opaque.

The second resin 4 contains 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin 4 taken as 100 wt %.

The second resin 4 allows fluorine atoms to distribute on the surface opposite to the substrate 2 of the polymer layer 8, improving the antifouling performance of the polymer layer 8. Further, such distribution of fluorine atoms on the surface opposite to the substrate 2 of the polymer layer 8 improves the smoothness of the polymer layer 8. This reduces the load (friction resistance) on the projections 9 in rubbing the surface of the polymer layer 8, and thus improves the rubbing resistance of the polymer layer 8. As in the present embodiment, in the method of forming the polymer layer 8 from the first resin 3 and the second resin 4, the presence of a fluorine-containing monomer in the second resin 4 enables efficient distribution of fluorine atoms on the surface opposite to the substrate 2 of the polymer layer 8.

The second resin 4 contains a reactive group-containing monomer. This enables the fluorine-containing monomer to gather on the surface opposite to the substrate 2 of the polymer layer 8 while maintaining the compatibility with the reactive group-containing monomer, increasing the concentration of fluorine atoms on this surface. In order to improve the adhesiveness between the first resin 3 and the second resin 4, it is important that the resins are immediately mixed with each other at the interface therebetween to form the resin layer 7 when the resins in the form of monomers are brought into contact with each other and that the resins show a continuously varying monomer composition and thus shows no interface between the resins in the polymer layer 8. Here, the reactive group-containing monomer can improve the compatibility between the first resin 3 and the second resin 4 to improve the adhesiveness between the resins. As a result, the polymer layer 8 can have improved rubbing resistance. The reactive group as used herein means a functional group reactive with another component in the presence of external energy such as light or heat. Examples of such a reactive group include amide, hydroxy, and acetoacetoxy groups.

Examples of the reactive group-containing monomer include amide-containing monomers such as N-(meth)acryloylmorpholine, N-(2-hydroxyethyl)(meth)acrylamide, and N,N-diethyl(meth)acrylamide; hydroxy-containing monomers such as 1,4-cyclohexanedimethanol mono(meth)acrylate and 4-hydroxybutyl (meth)acrylate; and acetacetoxy-containing monomers such as 2-acetacetoxyethyl (meth) acrylate. A known example of N-(meth)acryloylmorpholine is "ACMO®" (KJ Chemicals Corp.). A known example of N-(2-hydroxyethyl) (meth)acrylamide is "HEAA®" (KJ Chemicals Corp.). A known example of N,N-diethyl(meth) acrylamide is "DEAA®" (KJ Chemicals Corp.). A known example of 1,4-cyclohexanedimethanol mono(meth)acrylate is "CHDMMA" (Nippon Kasei Chemical Co., Ltd.). A known example of 4-hydroxybutyl (meth)acrylate is "4HBA" (Nippon Kasei Chemical Co., Ltd.). A known example of 2-acetacetoxyethyl (meth)acrylate is "AAEM" (Nippon Synthetic Chemical Industry Co., Ltd.). The second resin 4 may contain one or multiple of these reactive group-containing monomers. The reactive group-containing monomer preferably contains an acid amide bond in the molecule. The reactive group-containing monomer preferably has a solubility parameter of 10 $(cal/cm^3)^{1/2}$ or higher and 12 $(cal/cm^3)^{1/2}$ or lower.

The proportion of the reactive group-containing monomer in the second resin 4 (hereinafter, also referred to simply as the proportion of the reactive group-containing monomer) is 10 wt % or more and 50 wt % or less. Less than 10 wt % of the reactive group-containing monomer may cause the polymer layer 8 to be opaque, impairing the transparency thereof. More than 50 wt % of the reactive group-containing monomer may impair the rubbing resistance of the polymer layer 8. This is because as follows. Specifically, although the reactive group-containing monomer is preferably a monofunctional monomer from the viewpoints of the permeability into the first resin 3 and the viscosity, a monofunctional monomer has a low crosslinking density and, if the amount thereof is more than a predetermined amount, impairs the hardness and flexibility of the polymer layer 8. For the second resin 4 containing multiple reactive group-containing monomers, the sum of the proportions of the monomers has only to fall within the above range. The proportion of the reactive group-containing monomer is preferably 20 wt % or more and 50 wt % or less, more preferably 30 wt % or more and 40 wt % or less.

The second resin 4 contains a fluorosurfactant. This enables the second resin 4 to have better smoothness (leveling performance), preventing generation of liquid cissing in application.

Known examples of the fluorosurfactant include "Surflon®" (AGC Seimi Chemical Co., Ltd.), "Ftergent® 650A" (Neos Co., Ltd.), "FC-4430" (3M), "FC-4432" (3M), and "Eftop" (Mitsubishi Materials Electronic Chemicals Co., Ltd.). The second resin 4 may contain one or multiple of these fluorosurfactants. The fluorosurfactant preferably has a solubility parameter of 8 $(cal/cm^3)^{1/2}$ or higher and 10 $(cal/cm^3)^{1/2}$ or lower.

The proportion of the fluorosurfactant in the second resin 4 (hereinafter, also referred to simply as the proportion of the fluorosurfactant) is 10 wt % or more and 70 wt % or less. Less than 10 wt % of the fluorosurfactant impairs the smoothness of the second resin 4. More than 70 wt % of the fluorosurfactant causes generation of precipitates in the second resin 4. For the second resin 4 containing multiple fluorosurfactants, the sum of the proportions of the fluorosurfactants has only to fall within the above range. The proportion of the fluorosurfactant is preferably 20 wt % or more and 60 wt % or less, more preferably 40 wt % or more and 60 wt % or less.

The second resin 4 contains a fluorine-containing monomer. This reduces the surface energy of the polymer layer 8 and improves the antifouling performance of the polymer layer 8. Further, this enables fluorine atoms to distribute on the surface opposite to the substrate 2 of the polymer layer 8, improving the smoothness of the polymer layer 8. This results in improved rubbing resistance of the polymer layer 8.

Known examples of the fluorine-containing monomer include "Optool® DAC-HP" (Daikin Industries, Ltd.) (solubility parameter: 9.7 $(cal/cm^3)^{1/2}$), "Afluid" (AGC Inc.), "Megaface® RS-76-NS" (DIC Corp.), "Megaface RS-75" (DIC Corp.), "C10 Gacry" (Yushiseihin Co., Ltd.), and "C8 HGOL" (Yushiseihin Co., Ltd.). The second resin 4 may contain one or multiple of these fluorine-containing monomers. The fluorine-containing monomer preferably has a solubility parameter of 8 $(cal/cm^3)^{1/2}$ or higher and 10 $(cal/cm^3)^{1/2}$ or lower.

The fluorosurfactant and the fluorine-containing monomer are preferably curable by ultraviolet rays. The fluorosurfactant and the fluorine-containing monomer each preferably contain at least one of a —OCF$_2$— chain and a =NCO— chain. The fluorosurfactant and the fluorine-containing monomer are distinguished by the surface tension. The surface tension of the fluorosurfactant is preferably 0.1 dyn/cm or higher and 10 dyn/cm or lower. The fluorosurfactant having a surface tension of higher than 10 dyn/cm may cause easy generation of liquid cissing in application of the second resin 4, impairing the antifouling performance of the polymer layer 8. The surface tension of the fluorine-containing monomer is preferably 5 dyn/cm or higher and 50 dyn/cm or lower. The fluorine-containing monomer having a surface tension outside the above range may impair the ease of applying the second resin 4 (for example, atomization by ultrasonic spray is difficult). In order to improve the smoothness of the second resin 4, the fluorosurfactant preferably has a lower surface tension than the fluorine-containing monomer.

The proportion of the fluorine-containing monomer in the second resin 4 (hereinafter, also referred to simply as the proportion of the fluorine-containing monomer) is more than 0 wt % and 20 wt % or less. Zero percent by weight of the fluorine-containing monomer impairs the antifouling performance and rubbing resistance of the polymer layer 8. More than 20 wt % of the fluorine-containing monomer causes the polymer layer 8 to be opaque, reducing the transparency thereof. For the second resin 4 containing multiple fluorine-containing monomers, the sum of the proportions of the fluorine-containing monomers has only to fall within the above range. The proportion of the fluorine-containing monomer is preferably 1 wt % or more and 15 wt % or less, more preferably 5 wt % or more and 10 wt % or less.

The second resin 4 preferably has a thickness T2 of 0.1 μm or greater and 10 μm or smaller, more preferably 0.5 μm or greater and 5 μm or smaller. The second resin 4 having a thickness T2 of smaller than 0.1 μm may cause a lack of fluorine atoms on the surface opposite to the substrate 2 of the polymer layer 8. The second resin 4 having a thickness T2 of greater than 10 μm may be easily mixed with the first resin 3, causing the polymer layer 8 to be opaque and impairing the rubbing resistance of the polymer layer 8. In the present embodiment, the thickness T2 of the second resin 4 means the distance between the surface on the first resin 3 side to the surface opposite to the first resin 3, as illustrated in FIG. 1.

The second resin 4 preferably has a viscosity of 1 mPa·s or higher and 30 mPa·s or lower, more preferably 2 mPa·s or higher and 20 mPa·s or lower, at 25° C. The second resin 4 having a viscosity of lower than 1 mPa·s at 25° C. may cause uneven application thereof. The second resin 4 having a viscosity of higher than 30 mPa·s at 25° C. may cause fluorine atoms to be less easily distributed on the surface opposite to the substrate 2 of the polymer layer 8, impairing the antifouling performance of the polymer layer 8.

The second resin 4 preferably has a solubility parameter of 7 $(\text{cal/cm}^3)^{1/2}$ or higher and 15 $(\text{cal/cm}^3)^{1/2}$ or lower, more preferably 8 $(\text{cal/cm}^3)^{1/2}$ or higher and 12 $(\text{cal/cm}^3)^{1/2}$ or lower. The second resin 4 having a solubility parameter of lower than 7 $(\text{cal/cm}^3)^{1/2}$ may impair the compatibility between the first resin 3 and the second resin 4, causing the polymer layer 8 to be opaque. The second resin 4 having a solubility parameter of higher than 15 $(\text{cal/cm}^3)^{1/2}$ may impair the adhesion between the first resin 3 and the second resin 4.

The difference in solubility parameter between the first resin 3 and the second resin 4 is preferably 0 $(\text{cal/cm}^3)^{1/2}$ or greater and 3 $(\text{cal/cm}^3)^{1/2}$ or smaller. The first resin 3 and the second resin 4 satisfying a difference in solubility parameter of greater than 3 $(\text{cal/cm}^3)^{1/2}$ may impair the compatibility between the first resin 3 and the second resin 4, impairing the adhesion between the resins.

The polymer layer 8 preferably has a thickness T of 3 μm or greater and 15 μm or smaller, more preferably 5 μm or greater and 12 μm or smaller. The polymer layer 8 having a thickness T of smaller than 3 μm may cause defects such as bubbles and fine foreign matter (e.g., foreign matter transferred from the die 5) to be visible easily. The polymer layer 8 having a thickness T of greater than 15 μm may cause defects such as curl of the polymer layer 8 due to curing shrinkage of the resin layer 7. In the present embodiment, the thickness T of the polymer layer 8 means the distance from the surface on the substrate 2 side to the apex of a projection 9.

Examples of the shape of the projections 9 include those tapering toward the tip (tapered shapes) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 9 are inclined, but the bases may not be inclined but may be flat.

The pitch P between adjacent projections 9 may be any value that is not longer than the wavelength of visible light (780 nm), and is preferably 100 nm or greater and 400 nm or smaller, more preferably 100 nm or greater and 200 nm or smaller. With the pitch P between adjacent projections 9 of smaller than 100 nm, the moth-eye structure may have impaired mechanical resistance. With the pitch P between adjacent projections 9 of greater than 400 nm, the moth-eye structure may have impaired antireflective performance (low reflectivity) against light within a short wavelength region.

Each projection 9 preferably has a height of 50 nm or greater and 600 nm or smaller, more preferably 100 nm or greater and 300 nm or smaller. The projections 9 having a height of smaller than 50 nm may fail to give desired antireflective performance (low reflectivity). The projections 9 having a height of greater than 600 nm may impair the mechanical resistance of the moth-eye structure.

Each projection 9 preferably has an aspect ratio of 0.8 or greater and 2.0 or smaller, more preferably 1.0 or greater and 1.5 or smaller. The projections 9 having an aspect ratio of smaller than 0.8 may fail to sufficiently prevent occurrence of optical phenomena such as moiré and iridescence, possibly failing to achieve good reflection characteristics. The projections 9 having an aspect ratio of greater than 2.0 may impair the processability of the moth-eye structure, causing sticking or impairing the transferring conditions in formation of the moth-eye structure (e.g., causing clogging of die 5 or twining of the material). The aspect ratio of a projection as used herein means the ratio of the height of the projection of interest to the pitch between adjacent projections (height/pitch).

The projections 9 may be arranged either randomly or regularly. In order to prevent generation of moiré sufficiently, the projections 9 are preferably arranged randomly.

The die 5 may be one produced by the following method. First, silicon dioxide ($SiO_2$) serving as an insulating material and pure aluminum are successively formed into films on an aluminum substrate (in the form of roll). Next, the resulting pure aluminum layer is repetitively subjected to anodizing and etching. Thereby, a cavity (die 5) of the moth-eye structure can be produced. At this time, the uneven structure of the die 5 can be modified by adjusting the duration of the anodizing and the duration of the etching.

The surface of the die 5 has undergone release treatment with a fluorine release agent 6. Thereby, the die 5 can be easily removed from the resin layer 7 (polymer layer 8). Further, the fluorine release agent 6 can reduce the surface energy of the die 5, and thus increase the interaction with a fluorine-containing monomer in the second resin 4. Thus, fluorine atoms can efficiently be distributed on the surface opposite to the substrate 2 of the second resin 4 when the substrate 2 is pushed to the die 5 in Process (3). Further, this treatment can prevent early removal of fluorine atoms from the surface opposite to the substrate 2 of the resin layer 7 before curing of the resin layer 7. As a result, in the optical member 1, fluorine atoms can efficiently be distributed on the surface opposite to the substrate 2 of the polymer layer 8.

A known example of the fluorine release agent 6 is "Optool DSX" (Daikin Industries, Ltd.).

Accordingly, the method for producing an optical member of Embodiment 1 can produce the optical member 1 excellent in adhesiveness between the substrate and the polymer layer, antifouling performance, and rubbing resistance.

Figure 2:
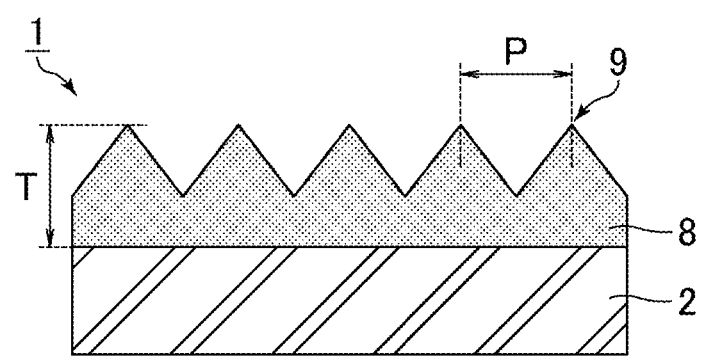
FIG. 2 is a schematic cross-sectional view of an optical member of Embodiment 1.

Next, the optical member of Embodiment 1 is described below with reference to FIG. 2. FIG. 2 is a schematic cross-sectional view of an optical member of Embodiment 1.

The optical member 1 includes the substrate 2 and the polymer layer 8 on a surface of the substrate 2. The polymer layer 8 includes on the surface thereof an uneven structure provided with multiple projections (protrusions) 9 at a pitch P (distance between the apexes of adjacent projections 9) not longer than the wavelength of visible light, i.e., a moth-eye structure (a structure like a moth's eye). Thus, the optical member 1 can exert excellent antireflective performance (low reflectivity) owing to the moth-eye structure.

The polymer layer 8 is a cured product obtainable by stacking a second resin on a first resin and curing the first resin and the second resin with the uneven structure stamped on the second resin side. The first resin contains a resin component. The resin component of the first resin contains 10 wt % or more and 30 wt % or less of a (meth)acrylamide compound and 20 wt % or more and 45 wt % or less of a urethane prepolymer containing six or more functional groups, with the whole quantity of the resin component taken as 100 wt %. The second resin contains 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin taken as 100 wt %.

In the optical member 1, the amide group on the surface of the polymer layer 8 on the substrate 2 side exerts a hydrogen bond force to strongly bind the substrate 2 and the polymer layer 8, providing a state with high adhesion between the substrate 2 and the polymer layer 8. Further, the urethane prepolymer containing six or more functional groups adequately increases the hardness of the polymer layer 8 and fluorine atoms improve the smoothness of the polymer layer 8, providing excellent rubbing resistance. In addition, fluorine atoms distributed on the surface opposite to the substrate 2 of the polymer layer 8 can provide excellent antifouling performance.

Accordingly, the optical member of Embodiment 1 can be provided as the optical member 1 excellent in adhesiveness between the substrate 2 and the polymer layer 8, antifouling performance, and rubbing resistance.

An example of the optical member of Embodiment 1 is an optical member produced by the aforementioned method for producing an optical member of Embodiment 1.

Embodiment 2

Figure 3:
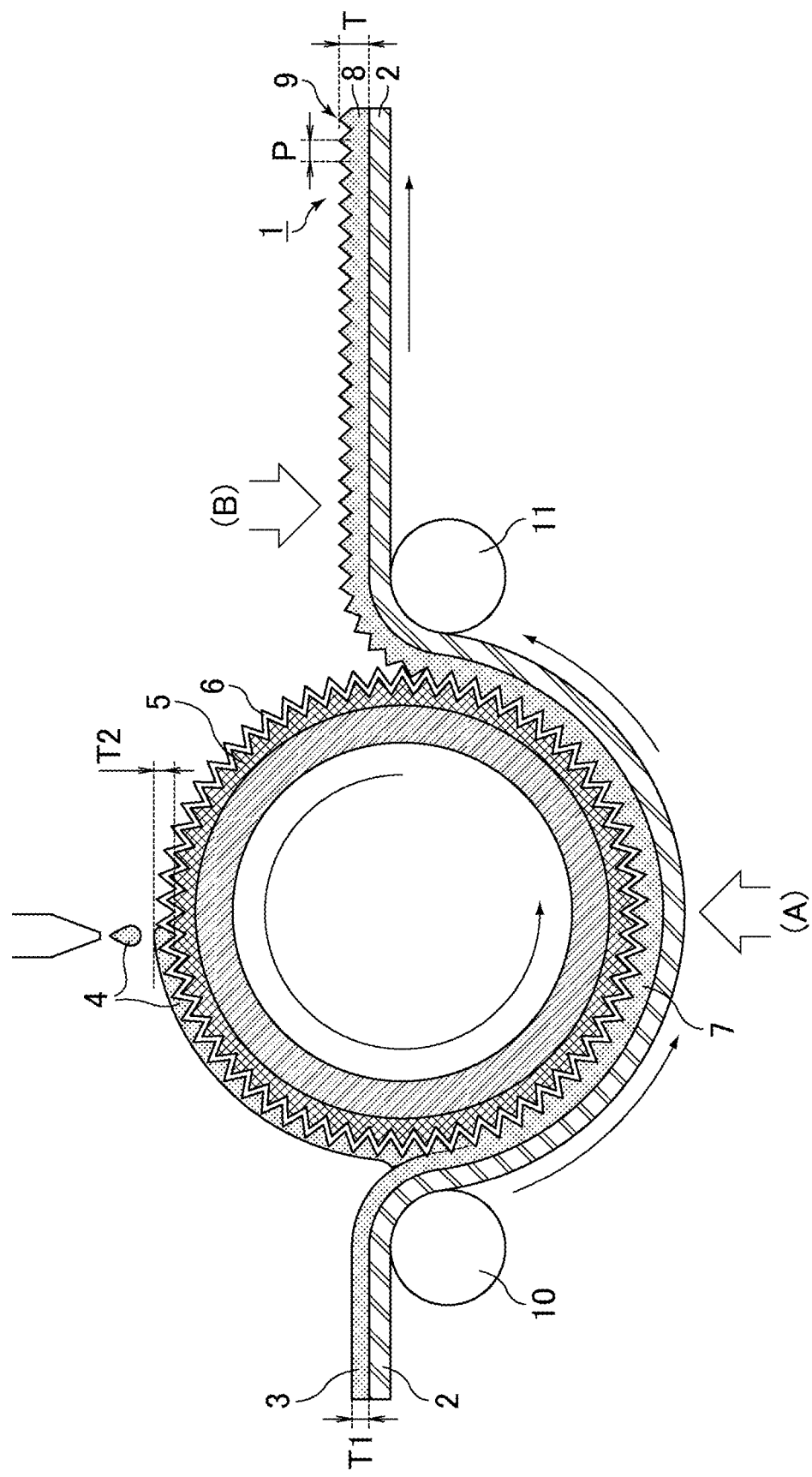
FIG. 3 is a schematic cross-sectional view illustrating a process of producing an optical member of Embodiment 2.

A method for producing an optical member of Embodiment 2 is described below with reference to FIG. 3. FIG. 3 is a schematic cross-sectional view illustrating a process of producing an optical member of Embodiment 2. The method for producing an optical member of Embodiment 2 is the same as the method for producing an optical member of Embodiment 1, except that the second resin is applied to the die. Thus, descriptions of the same features are omitted as appropriate. The optical member of Embodiment 2 is the same as the optical member of Embodiment 1, and thus description thereof is omitted.

(Process (1): Application of First Resin)

First, the first resin 3 is applied to the substrate 2.

(Process (2): Application of Second Resin)

Next, the second resin 4 is applied to the die 5 (on the uneven surface). The surface of the die 5 is coated with the fluorine release agent 6 in advance.

The application of the first resin 3 (Process (1)) and the application of the second resin 4 (Process (2)) may be performed non-simultaneously or may be performed simultaneously.

(Process (3): Formation of Resin Layer)

Next, the substrate 2 is pushed to the die 5 using the nip roll 10 with the first resin 3 and the second resin 4 in between. As a result, the resin layer 7 is formed which has an uneven structure on the surface opposite to the substrate 2.

(Process (4): Curing of Resin Layer)

Next, the resin layer 7 is cured (polymerized), so that the polymer layer 8 is formed. As a result, the optical member 1 is completed.

The application of the second resin 4 (Process (2)) is performed on the first resin 3 in Embodiment 1 and on the die 5 in Embodiment 2. Still, the second resin 4 may be applied to both the first resin 3 and the die 5.

The present invention is described in more detail below referring to examples and comparative examples. The examples, however, are not intended to limit the scope of the present invention.

(Materials)

The materials used for producing optical members in the examples and comparative examples were as follows.

(Substrate 2)

"Fujitac® TD-60" (Fujifilm Corp.) was used. The thickness thereof was 60 µm.

(First Resin 3)

Resins A1 to A12 having the respective compositions as shown in Table 1 and Table 2 were used. The values of the compositions of the respective first resins shown in Table 1 and Table 2 are expressed in parts by weight. The names of the materials shown in Table 1 and Table 2 are as follows.

<(Meth)Acrylamide Compound>

DM: "DMAA" (KJ Chemicals Corp.)

<Urethane Prepolymer>

UA: "UA-306H" (Kyoeisha Chemical Co., Ltd.)

U1: A prepolymer produced as follows was used. First, a round flask (capacity: 300 mL) equipped with a stirrer was charged with 16.9 g of hexamethylene diisocyanate (Tokyo Chemical Industry Co., Ltd.) and 1.0 g of diethylene glycol (Tokyo Chemical Industry Co., Ltd.), and the contents were reacted for five hours at 70° C. in accordance with a usual method. Then, 212 g of dipentaerythritol penta- and hexaacrylate ("Aronix M-400", Toagosei Co., Ltd.) was added thereto and the contents were reacted for four hours at 70° C. The resulting reaction product was subjected to infrared absorption spectrometry, gel permeation chromatography, and nuclear magnetic resonance analysis to find that a desired urethane prepolymer was obtained.

U2: A prepolymer produced as follows was used. First, a round flask (capacity: 300 mL) equipped with a stirrer was charged with 16.9 g of hexamethylene diisocyanate (Tokyo Chemical Industry Co., Ltd.) and 3.5 g of ethylene glycol (Tokyo Chemical Industry Co., Ltd.), and the contents were reacted for five hours at 70° C. in accordance with a usual method. Then, 212 g of dipentaerythritol penta- and hexaacrylate ("Aronix M-400", Toagosei Co., Ltd.) was added thereto and the contents were reacted for four hours at 70° C. The resulting reaction product was subjected to infrared absorption spectrometry, gel permeation chromatography, and nuclear magnetic resonance analysis to find that a desired urethane prepolymer was obtained.

UF: "UF-8001G" (Kyoeisha Chemical Co., Ltd.)
<Monofunctional Acrylate>
IB: "Light Acrylate IB-XA" (Kyoeisha Chemical Co., Ltd.)
<Multifunctional Acrylate>
EG: "Light Acrylate 14-EGA" (Kyoeisha Chemical Co., Ltd.)
PT: "NK Ester A-PTMG-65" (Shin Nakamura Chemical Co., Ltd.)
ND: "Light Acrylate 1,9ND-A" (Kyoeisha Chemical Co., Ltd.)
M: "Aronix M-400" (Toagosei Co., Ltd.)

<Polymerization Initiator>
IR184: "Irgacure 184" (BASF SE)
IRTPO: "Irgacure TPO" (BASF SE)

Table 1 and Table 2 also show the proportion of the (meth)acrylamide compound, the proportion of the urethane prepolymer containing six or more functional groups, the viscosity, and the solubility parameter of each first resin.

The viscosity was determined at 25° C. using Vismetron viscosity meter "VDA2" (Shibaura System).

The solubility parameter was calculated by turbidimetric titration. Specifically, two resin solutions were prepared each by dissolving 0.50 g of a resin in 10 ml of tetrahydrofuran (THF) in an Erlenmeyer flask. Then, to one resin solution was dropped ion exchange water, while to the other resin solution was dropped normal-hexane. Based on the amounts of ion exchange water and normal-hexane dropped at the timing when the respective resin solutions started to become turbid, the solubility parameters of the respective resins were calculated. If a resin contains a solvent, the solubility parameter is calculated to the exclusion of the solvent (calculated based on the solid content).

TABLE 1

| | | | | Number of | | | First resin | | |
| | | | Material | functional | | | | | |
| | | Type | name | groups | A1 | A2 | A3 | A4 | A5 |
|---|---|---|---|---|---|---|---|---|---|
| Composition | Resin component | (Meth)acrylamide compound | DM | 1 | 18 | 18 | 14 | 14 | 14 |
| | | Urethane prepolymer | UA | 6 | 38 | — | — | — | — |
| | | | U1 | 10 | — | 36 | 36 | 40 | — |
| | | | U2 | 10 | — | — | — | — | 36 |
| | | | UF | 2 | — | — | — | — | — |
| | | Monofunctional acrylate | IB | 1 | — | — | — | — | — |
| | | Polyfunctional acrylate | EG | 2 | 29 | 31 | 35 | 31 | 35 |
| | | | PT | 2 | 15 | 15 | 15 | 15 | 15 |
| | | | ND | 2 | — | — | — | — | — |
| | | | M | 6 | — | — | — | — | — |
| | Additive component | Polymerization initiator | IR184 | 0 | 2 | 2 | 2 | 2 | 2 |
| | | | IRTPO | 0 | 4 | 4 | 4 | 4 | 4 |
| Proportion of (meth)acrylamide compound (wt %) | | | | | 18 | 18 | 14 | 14 | 14 |
| Proportion of urethane prepolymer containing six or more functional groups (wt %) | | | | | 38 | 36 | 36 | 40 | 36 |
| Viscosity (mPa · s) | | | | | 80 | 84 | 115 | 130 | 214 |
| Solubility parameter (cal/cm$^3$)$^{1/2}$ | | | | | 11.80 | 11.53 | 11.56 | 11.50 | 11.07 |

TABLE 2

| | | | | Number of | | | First resin | | | |
| | | | Material | functional | | | | | | |
| | | Type | name | groups | A6 | A7 | A8 | A9 | A10 | A11 | A12 |
|---|---|---|---|---|---|---|---|---|---|---|---|
| Composition | Resin component | (Meth)acrylamide compound | DM | 1 | — | 14 | 14 | 9 | 31 | 14 | 14 |
| | | Urethane prepolymer | UA | 6 | — | — | — | — | — | — | — |
| | | | U1 | 10 | 36 | — | — | 36 | 36 | 18 | 47 |
| | | | U2 | 10 | — | — | — | — | — | — | — |
| | | | UF | 2 | — | 36 | — | — | — | — | — |
| | | Monofunctional acrylate | IB | 1 | 14 | — | — | — | — | — | — |
| | | Polyfunctional acrylate | EG | 2 | 35 | 35 | 35 | 40 | 18 | 53 | 24 |
| | | | PT | 2 | 15 | 15 | 15 | 15 | 15 | 15 | 15 |
| | | | ND | 2 | — | — | — | — | — | — | — |
| | | | M | 6 | — | — | 36 | — | — | — | — |
| | Additive component | Polymerization initiator | IR184 | 0 | 2 | 2 | 2 | 2 | 2 | 2 | 2 |
| | | | IRTPO | 0 | 4 | 4 | 4 | 4 | 4 | 4 | 4 |
| Proportion of (meth)acrylamide compound (wt %) | | | | | 0 | 14 | 14 | 9 | 31 | 14 | 14 |
| Proportion of urethane prepolymer containing six or more functional groups (wt %) | | | | | 36 | 0 | 0 | 36 | 36 | 18 | 47 |

TABLE 2-continued

| Type | Material name | Number of functional groups | First resin | | | | | | |
|---|---|---|---|---|---|---|---|---|---|
| | | | A6 | A7 | A8 | A9 | A10 | A11 | A12 |
| Viscosity (mPa · s) | | | 230 | 500 | 76 | 160 | 40 | 74 | 157 |
| Solubility parameter (cal/cm$^3$)$^{1/2}$ | | | 11.31 | 10.10 | 12.04 | 11.55 | 11.61 | 12.03 | 11.46 |

(Second Resin 4)

The second resin B1 prepared by mixing the following materials was used. The value attached to each material indicates the proportion of the material in the second resin B1. The viscosity of the second resin B1, determined in the same manner as in the first resins A1 to A12, was 12 mPa·s at 25° C. The solubility parameter of the second resin B1, determined in the same manner as in the first resins A1 to A12, was 9.7 (cal/cm$^3$)$^{1/2}$.

<Reactive Group-Containing Monomer>
ACMO (KJ Chemicals Corp.): 40 wt %
<Fluorosurfactant>
Surflon (AGC Seimi Chemical Co., Ltd.): 50 wt %

The fluorosurfactant contained a perfluoroalkyl (carboxylic acid salt) chain.
<Fluorine-Containing Monomer>
Optool DAC-HP (Daikin Industries, Ltd.): 10 wt %

The fluorine-containing monomer contained a perfluoropolyether chain.

(Die 5)

A die produced by the following method was used. First, a film of aluminum serving as a material of the die 5 was formed on a glass substrate by sputtering. Next, the resulting aluminum layer was repetitively subjected to anodizing and etching. Thereby, an anodizing layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum layer (a tapered shape). As a result, the die 5 having an uneven structure was obtained. The duration of a single anodizing process was 316 seconds, and the duration of a single etching process was 825 seconds. The die 5 was subjected to scanning electron microscopic observation and was found to have a pitch (distance between bottom points) between adjacent recesses of 200 nm and a recess depth of 350 nm.

(Fluorine Release Agent 6)
"Optool DSX" (Daikin Industries, Ltd.) was used.

Example 1

An optical member of Example 1 was produced by the method for producing an optical member of Embodiment 1.
(Process (1): Application of First Resin)

First, the first resin 3 was applied to the substrate 2 using a bar coater "No. 05" (Dai-ichi Rika).

The first resin 3 used was the first resin A1. The thickness T1 of the first resin 3 was 9 μm.
(Process (2): Application of Second Resin)

Next, the second resin 4 was applied to the first resin 3 using an ultrasonic spray (Sono-Tek Corp.) (trade name of nozzle: Vortex). As a result, the second resin 4 was formed on the first resin 3 on the side opposite to the substrate 2.

The second resin 4 used was the second resin B1. The thickness T2 of the second resin 4 was 1 μm.
(Process (3): Formation of Resin Layer)

Next, the substrate 2 was pushed to the die 5 using the nip roll 10 with the first resin 3 and the second resin 4 in between. As a result, the resin layer 7 was formed which has an uneven structure on the surface opposite to the substrate 2. The surface of the die 5 was coated with the fluorine release agent 6 (thickness: 2 to 3 nm) in advance.
(Process (4): Curing of Resin Layer)

Next, the resin layer 7 was cured (polymerized) by applying ultraviolet rays (dose: 1 J/cm$^2$) from the substrate 2 side using a UV lamp "Light Hammer 6J6P3" (Heraeus Holding GmbH), so that the polymer layer 8 was formed. The thickness T of the polymer layer 8 was 7 μm. Then, the polymer layer 8 was released from the die 5 using the release roll 11. As a result, the optical member 1 was completed.

The surface specifications of the optical member 1 were as follows. The surface specifications of the optical members were evaluated using a scanning electron microscope "S-4700" (Hitachi High-Technologies Corp.). For the evaluation, osmium(VIII) oxide (thickness: 5 nm) (Wako Pure Chemical Industries, Ltd.) was applied to the surface opposite to the substrate 2 of the polymer layer 8 using an osmium coater "Neoc-ST" (Meiwafosis Co., Ltd.).

Shape of projection 9: temple-bell-like shape
Pitch P between adjacent projections 9: 200 nm
Height of projection 9: 200 to 225 nm
Aspect ratio of projection 9: 1.0 to 1.125

Examples 2 to 5 and Comparative Examples 1 to 7

Optical members of the respective examples were produced in the same manner as in Example 1, except that the materials shown in Table 3 and Table 4 were used.
[Evaluation 1 of Optical Member]

The optical members of Examples 1 to 5 and Comparative Examples 1 to 7 were subjected to evaluation of the adhesiveness between the substrate and the polymer layer (hereinafter, also referred to simply as adhesiveness), the antifouling performance, the rubbing resistance, the transparency, and the hue unevenness. The results are shown in Table 3 and Table 4.
(Adhesiveness)

The adhesiveness was evaluated by the test in accordance with "JIS K5600-5-6". The number of squares was 100 with 1 mm cut spacing. The tape for removal used was "Cellotape®" (Nichiban Co., Ltd.). The test results were expressed by "X/100" (X: number of squares where the polymer layer remained on the substrate). The cases where the classification of the test result was 0 or 1 were evaluated as allowable (having excellent adhesiveness).
(Antifouling Performance)

For the antifouling performance, the ease of wiping off fingerprints was evaluated. Specifically, first, fingerprints were left on the surface (the surface opposite to the substrate of the polymer layer) of the optical member of each example, and were left at a temperature of 25° C. and a humidity of 40% to 60% for three days. The surface of the optical member of each example was then wiped 50 times in one direction using nonwoven fabric "Savina®" (KB Seiren, Ltd.). Whether the fingerprints were wiped off or not was visually observed in an environment with an illuminance of 100 lx (fluorescent lamp). The evaluation criteria were as follows.

Excellent: The fingerprints were completely wiped off and no wiping residue was observed.

Good: The fingerprints were wiped off, but slight wiping residue was observed when observed at a shallow angle.

Fair: Most of the fingerprints were not wiped off.

Poor: The fingerprints were not wiped off at all.

The cases where the performance was excellent or good were evaluated as allowable (having excellent antifouling performance).

(Rubbing Resistance)

For the rubbing resistance, the steel wool resistance and the smoothness were evaluated.

The steel wool resistance was evaluated as follows. First, the surface (the surface opposite to the substrate of the polymer layer) of the optical member of each example was rubbed with steel wool "#0000" (Nihon Steel Wool Co., Ltd.) with a predetermined load. The load was checked at which a scratch was left on the surface of the optical member of each example (hereinafter, also referred to as load G). Rubbing with steel wool was performed using a surface property tester "14FW" (Shinto Scientific Co., Ltd.) as a testing device at a stroke width of 30 mm and a rate of 100 mm/s. The number of rubbing was 10 reciprocations. A scratch was visually checked under an illuminance of 100 lx (fluorescent lamp). The evaluation criteria were as follows.

Level 1: The load G was lower than 10 g (the worst steel wool resistance).

Level 2: The load G was 10 g or higher and lower than 30 g.

Level 3: The load G was 30 g or higher and lower than 50 g.

Level 4: The load G was 50 g or higher and lower than 80 g.

Level 5: The load G was 80 g or higher and lower than 100 g.

Level 6: The load G was 100 g or higher and lower than 120 g.

Level 7: The load G was 120 g or higher and lower than 150 g.

Level 8: The load G was 150 g or higher and lower than 180 g.

Level 9: The load G was 180 g or higher and lower than 200 g.

Level 10: The load G was 200 g or higher (the best steel wool resistance).

The cases where the result was Level 6 to 10 were evaluated as allowable (having excellent steel wool resistance).

For the smoothness, the friction resistance of the surface (the surface opposite to the substrate of the polymer layer) of the optical member of each example was evaluated. Specifically, the surface (the surface opposite to the substrate of the polymer layer) of the optical member of each example was rubbed once with steel wool "#0000" (Nihon Steel Wool Co., Ltd.) with a load of 400 g. The dynamic friction resistance at this time was measured. Rubbing with steel wool was performed using a surface property tester "14FW" (Shinto Scientific Co., Ltd.) as a testing device at a stroke width of 20 mm and a rate of 0.5 mm/s. The cases where the friction resistance was 1.1 N or lower were judged as allowable (having excellent smoothness).

In the aforementioned evaluation methods, the cases where the steel wool resistance and the smoothness were evaluated as allowable were evaluated as having excellent rubbing resistance.

(Transparency)

For the transparency, the opacity of the optical member of each example was evaluated. Specifically, a transmitted image through the optical member of each example was visually observed under an illuminance of 100 lx (fluorescent lamp). Thereby, the opacity was checked.

The evaluation criteria were as follows.

Good: No opacity was observed.

Poor: Opacity was observed.

(Hue Unevenness)

The hue unevenness was evaluated as follows. First, a black acrylic plate was attached to the back side (the surface opposite to the polymer layer of the substrate) of the optical member of each example with a pressure-sensitive adhesive ("PDS1", Panac Corp.) in between. Then, the surface (surface opposite to the substrate of the polymer layer) of the optical member of each example was visually observed under an illuminance of 100 lx (fluorescent lamp) at a shallow angle. Thereby, the hue unevenness was checked. The evaluation criteria were as follows.

Good: No hue unevenness was observed.

Poor: Hue unevenness was observed.

TABLE 3

|  |  | Example 1 | Example 2 | Example 3 | Example 4 | Example 5 |
|---|---|---|---|---|---|---|
| First resin |  | A1 | A2 | A3 | A4 | A5 |
| Second resin |  | B1 | B1 | B1 | B1 | B1 |
| Adhesiveness | Result | 100/100 | 100/100 | 100/100 | 100/100 | 100/100 |
|  | Classification | 0 | 0 | 0 | 0 | 0 |
| Antifouling performance | Ease of wiping off fingerprints | Good | Good | Good | Good | Excellent |
| Rubbing resinstance | Steel wool resistance | Level 6 | Level 7 | Level 9 | Level 8 | Level 7 |
|  | Smoothness (friction resistance (N)) | 1.0 | 1.1 | 1.0 | 1.0 | 0.8 |
| Transparency | Opacity | Good | Good | Good | Good | Good |
| Hue unevenness |  | Good | Good | Good | Good | Good |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| First resin |  | A6 | A7 | A8 | A9 | A10 | A11 | A12 |
| Second resin |  | B1 | B1 | B1 | B1 | B1 | B1 | B1 |
| Adhesiveness | Result | 37/100 | 97/100 | 100/100 | 66/100 | 100/100 | 100/100 | 100/100 |
|  | Classification | 4 | 1 | 0 | 3 | 0 | 0 | 0 |
| Antifouling performance | Ease of wiping off fingerprints | Good | Fair | Good | Excellent | Fair | Excellent | Good |
| Rubbing resinstance | Steel wool resistance | Level 8 | Level 2 | Level 6 | Level 7 | Level 4 | Level 5 | Level 5 |
|  | Smoothness (friction resistance (N)) | 1.0 | 2.5 | 1.1 | 1.0 | 1.0 | 1.8 | 1.0 |
| Transparency | Opacity | Good | Poor | Good | Good | Good | Poor | Good |
| Hue unevenness |  | Poor | Good | Poor | Poor | Good | Good | Poor |

Table 3 shows that Examples 1 to 5 each provided excellent adhesiveness, antifouling performance, and rubbing resistance. In particular, Example 5 provided better antifouling performance and Examples 3 to 5 provided better rubbing resistance. In other words, the results show that it is preferred to increase the viscosity of the first resin in order to further improve the antifouling performance and the rubbing resistance. This shows that fluorine atoms in the second resin were allowed to be easily distributed on the surface (the surface opposite to the substrate of the polymer layer) of the optical member. Further, Examples 1 to 5 each provided excellent transparency and caused no hue unevenness.

In contrast, as shown in Table 4, the resin component of the first resin contained no (meth)acrylamide compound in Comparative Example 1. Thus, the adhesiveness was poor and the hue unevenness was generated. In Comparative Example 2, the resin component of the first resin contained no urethane prepolymer containing six or more functional groups, although it contained a bifunctional urethane prepolymer. Thus, the antifouling performance and the rubbing resistance were poor and the transparency was also poor. In Comparative Example 3, the resin component of the first resin contained no urethane prepolymer containing six or more functional groups, although it contained a hexafunctional acrylate. Thus, the hue unevenness was generated. In Comparative Example 4, the proportion of the (meth)acrylamide compound was lower than 10 wt %, and thus the adhesiveness was poor and the hue unevenness was generated. In Comparative Example 5, the proportion of the (meth)acrylamide compound was higher than 30 wt %, and thus the antifouling performance and the rubbing resistance were poor. In Comparative Example 6, the proportion of the urethane prepolymer containing six or more functional groups was lower than 20 wt %, and thus the rubbing resistance was poor and the transparency was also poor. In Comparative Example 7, the proportion of the urethane prepolymer containing six or more functional groups was higher than 45 wt %, and thus the rubbing resistance was poor and the hue unevenness was generated.

[Evaluation 2 of Optical Member]

For the optical members of Examples 3 to 5, the contact angle of hexadecane on the surface was determined in order to evaluate the antifouling performance. Specifically, hexadecane was dropped to the surface (the surface opposite to the substrate of the polymer layer) of the optical member of each example, and the contact angle was measured immediately after, one minute after, two minutes after, three minutes after, and four minutes after the dropping. The measurement results are shown in Table 5. Each contact angle in Table 5 was the average value of contact angles measured at three points by the θ/2 method (θ/2=arctan(h/r), θ: contact angle, r: radius of droplet, h: height of droplet) using a portable contact angle meter "PCA-1" (Kyowa Interface Science Co., Ltd.). A first measurement point selected was the central portion of the optical member of each example, and second and third measurement points selected were points at least 20 mm apart from the first measurement point and symmetrical to each other about the first measurement point.

TABLE 5

|  |  | Example 3 | Example 4 | Example 5 |
|---|---|---|---|---|
| Hexadecane contact angle (°) | Immediately after dropping | 87.0 | 84.2 | 91.4 |
|  | 1 Minute after dropping | 72.4 | 57.3 | 83.6 |
|  | 2 Minutes after dropping | 67.7 | 47.5 | 82.8 |
|  | 3 Minutes after dropping | 65.3 | 46.1 | 82.4 |
|  | 4 Minutes after dropping | 64.0 | 43.0 | 81.7 |

Table 5 shows that Example 5 provided a greater contact angle immediately after and also four minutes after the dropping than Examples 3 and 4. Thus, Example 5 showed a smaller change in the contact angle over time than Examples 3 and 4 and maintained the antifouling performance for a long time.

[Additional Remarks]

One aspect of the present invention may be a method for producing an optical member including a polymer layer that includes on a surface thereof an uneven structure provided with multiple projections at a pitch not longer than a wavelength of visible light, the method including:

Process (1) of applying a first resin to a substrate;

Process (2) of applying a second resin to at least one of the first resin and a die;

Process (3) of pushing the substrate to the die with the first resin and the second resin in between to form a resin layer including on a surface thereof the uneven structure; and Process (4) of curing the resin layer to provide the polymer layer, the die including a surface after release treatment with a fluorine release agent, the first resin containing a resin component, the resin component containing 10 wt % or more and 30 wt % or less of a (meth)acrylamide compound and 20 wt % or more and 45 wt % or less of a urethane prepolymer containing six or more functional groups, with the whole quantity of the resin component taken as 100 wt %, the second resin containing 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin taken as 100 wt %. This aspect enables production of an optical member excellent in adhesiveness between the substrate and the polymer layer, antifouling performance, and rubbing resistance.

The first resin may have a viscosity of 70 mPa·s or higher and 10000 mPa·s or lower at 25° C. This embodiment enables fluorine atoms in the second resin to be likely to distribute on the surface opposite to the substrate of the polymer layer. Further, this embodiment can favorably improve the ease of applying the first resin.

The first resin may have a solubility parameter of 10 $(cal/cm^3)^{1/2}$ or higher and 12 $(cal/cm^3)^{1/2}$ or lower. This embodiment can favorably improve the antifouling performance of the polymer layer. Further, this embodiment can improve the compatibility between the first resin and the second resin and favorably improve the adhesiveness between the resins.

The first resin and the second resin may satisfy a difference in solubility parameter of 0 $(cal/cm^3)^{1/2}$ or greater and 3 $(cal/cm^3)^{1/2}$ or smaller. This embodiment can improve the compatibility between the first resin and the second resin and favorably improve the adhesiveness between the resins.

The first resin may further contain 0.1 parts by weight or more and 10 parts by weight or less of a polymerization initiator with the whole quantity of the resin component taken as 100 parts by weight. This embodiment enables the resin layer to cure sufficiently, providing desired properties. Further, this embodiment can favorably improve properties such as the rubbing resistance and the light resistance of the polymer layer.

The (meth)acrylamide compound may contain N,N-dimethyl (meth)acrylamide. This embodiment enables effective use of the (meth)acrylamide compound.

The urethane prepolymer containing six or more functional groups may contain hexamethylene diisocyanate as a constituent. This embodiment enables effective use of the urethane prepolymer containing six or more functional groups.

The fluorosurfactant and the fluorine-containing monomer each may contain at least one of a —$OCF_2$— chain and a =NCO— chain. This embodiment enables effective use of the fluorosurfactant and the fluorine-containing monomer.

Another aspect of the present invention may be an optical member including a substrate and a polymer layer that is disposed on a surface of the substrate and that includes on a surface thereof an uneven structure provided with multiple projections at a pitch not longer than a wavelength of visible light, the polymer layer being a cured product obtainable by stacking a second resin on a first resin and curing the first resin and the second resin with the uneven structure stamped on the second resin side, the first resin containing a resin component, the resin component containing 10 wt % or more and 30 wt % or less of a (meth)acrylamide compound and 20 wt % or more and 45 wt % or less of a urethane prepolymer containing six or more functional groups, with the whole quantity of the resin component taken as 100 wt %, the second resin containing 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin taken as 100 wt %. This aspect can provide an optical member excellent in adhesiveness between the substrate and the polymer layer, antifouling performance, and rubbing resistance.

REFERENCE SIGNS LIST

1: optical member
2: substrate
3: first resin
4: second resin
5: die
6: fluorine release agent
7: resin layer
8: polymer layer
9: projection
10: nip roll
11: release roll
P: pitch
T: thickness of polymer layer
T1: thickness of first resin
T2: thickness of second resin

The invention claimed is:

1. A method for producing an optical member including a polymer layer that includes on a surface thereof an uneven structure provided with multiple projections at a pitch not longer than a wavelength of visible light, the method comprising:

Process (1) of applying a first resin to a substrate;

Process (2) of applying a second resin to at least one of the first resin and a die;

Process (3) of pushing the substrate to the die with the first resin and the second resin in between to form a resin layer including on a surface thereof the uneven structure; and Process (4) of curing the resin layer to provide the polymer layer, the die including a surface after release treatment with a fluorine release agent, the first resin containing a resin component, the resin component containing 10 wt % or more and 30 wt % or less of a (meth)acrylamide compound and 20 wt % or more and 45 wt % or less of a urethane prepolymer containing six or more functional groups, with the whole quantity of the resin component taken as 100 wt %, the second resin containing 10 wt % or more and 50 wt % or less of a reactive group-containing monomer, 10 wt % or more and 70 wt % or less of a fluorosurfactant, and more than 0 wt % and 20 wt % or less of a fluorine-containing monomer, with the whole quantity of the second resin taken as 100 wt %, and the reactive group-containing monomer including at least one of an amide group, a hydroxy group, and an acetoacetoxy group as a reactive group.

2. The method for producing an optical member according to claim 1, wherein the first resin has a viscosity of 70 mPa·s or higher and 10000 mPa·s or lower at 25° C.

3. The method for producing an optical member according to claim 1, wherein the first resin has a solubility parameter of 10 $(cal/cm^3)^{1/2}$ or higher and 12 $(cal/cm^3)^{1/2}$ or lower.

4. The method for producing an optical member according to claim 1, wherein the first resin and the second resin satisfy a difference in solubility parameter of 0 $(\text{cal/cm}^3)^{1/2}$ or greater and 3 $(\text{cal/cm}^3)^{1/2}$ or smaller.

5. The method for producing an optical member according to claim 1,
wherein the first resin further contains 0.1 parts by weight or more and 10 parts by weight or less of a polymerization initiator with the whole quantity of the resin component taken as 100 parts by weight.

6. The method for producing an optical member according to claim 1,
wherein the (meth)acrylamide compound contains N,N-dimethyl (meth)acrylamide.

7. The method for producing an optical member according to claim 1,
wherein the urethane prepolymer containing six or more functional groups contains hexamethylene diisocyanate as a constituent.

8. The method for producing an optical member according to claim 1,
wherein the fluorosurfactant and the fluorine-containing monomer each contain at least one of a —$OCF_2$— chain and a =NCO— chain.

* * * * *